(12) United States Patent
Davidsson et al.

(10) Patent No.: US 10,694,078 B1
(45) Date of Patent: Jun. 23, 2020

(54) MOTION SICKNESS REDUCTION FOR IN-VEHICLE DISPLAYS

(71) Applicant: Volvo Car Corporation, Göteborg (SE)

(72) Inventors: Staffan Davidsson, Vastra Frolunda (SE); Vincent Nils Oliver Tollesson, Göteborg (SE)

(73) Assignee: VOLVO CAR CORPORATION, Göteborg (SE)

( * ) Notice: Subject to any disclaimer, the term of this patent is extended or adjusted under 35 U.S.C. 154(b) by 0 days.

(21) Appl. No.: 16/279,346

(22) Filed: Feb. 19, 2019

(51) Int. Cl.
    *G08G 1/00* (2006.01)
    *H04N 5/14* (2006.01)
    *H04N 5/21* (2006.01)
    *B60Q 9/00* (2006.01)

(52) U.S. Cl.
    CPC .............. *H04N 5/145* (2013.01); *H04N 5/21* (2013.01); *B60Q 9/00* (2013.01)

(58) Field of Classification Search
    CPC .................................. H04N 5/45; H04N 5/21
    USPC .............. 340/901, 905–907, 932.2; 345/156; 701/302
    See application file for complete search history.

(56) References Cited

U.S. PATENT DOCUMENTS

| | | | |
|---|---|---|---|
| 7,128,705 B2 | 10/2006 | Brendley et al. | |
| 9,145,129 B2 | 9/2015 | Worrel et al. | |
| 9,818,171 B2 | 11/2017 | Zaitsev et al. | |
| 10,043,316 B2 | 8/2018 | Donnelly et al. | |
| 2005/0159865 A1* | 7/2005 | Bos | B60R 16/0232 701/39 |
| 2008/0199167 A1 | 8/2008 | Daly | |
| 2012/0105486 A1 | 5/2012 | Lankford et al. | |
| 2013/0162603 A1 | 6/2013 | Peng et al. | |
| 2013/0234929 A1 | 9/2013 | Libin | |
| 2014/0176296 A1 | 6/2014 | Morgan | |
| 2015/0120149 A1* | 4/2015 | Worrel | A61M 21/02 701/49 |
| 2018/0162186 A1 | 6/2018 | Anderson et al. | |
| 2018/0313663 A1* | 11/2018 | Kobayashi | H04M 1/00 |
| 2018/0326999 A1 | 11/2018 | Hershkovitz et al. | |
| 2019/0061655 A1* | 2/2019 | Son | A61M 21/00 |

* cited by examiner

*Primary Examiner* — Tai T Nguyen
(74) *Attorney, Agent, or Firm* — Shumaker & Sieffert, P.A.

(57) ABSTRACT

An example computing system of this disclosure includes a memory and processing circuitry in communication with the memory. The memory is configured to store a predictive movement model. The processing circuitry is configured to receive road condition information, to detect a discrepancy between the received road condition information and a portion of the predictive movement model, and to update the predictive movement model based on the received road condition information to correct the discrepancy. The processing circuitry is further configured to control one or more display devices in communication with the processing circuitry to adjust video data output by the one or more display devices based on the updated predictive movement model.

17 Claims, 7 Drawing Sheets

MOTION SICKNESS REDUCTION FOR IN-VEHICLE DISPLAYS

BACKGROUND

Vehicles are increasingly being equipped with display devices for various purposes. As examples, the display devices may output information relating to the vehicle's condition, current or past trips, or may be used for entertainment purposes. In general, the displays form a portion of so-called "infotainment" systems of the vehicle. With the growth of self-driving technology, the integration display technology in vehicle cabins is likely to increase, because passengers will be less encumbered by navigation and vehicle-operation duties. Examples of display devices that are integrated into some vehicles or may be integrated into vehicles manufactured in the future include console screens, virtual reality (VR) displays, augmented reality (AR) displays, in-cabin monitors, and displays that can be overlayed on windows, windshields, etc.

SUMMARY

Vehicle occupants' use and enjoyment of the video data output by such displays are often diminished due to disruptions in the smoothness of the vehicle's movement. For instance, passengers might experience symptoms of motion sickness (e.g., car sickness) due to jittering or other micro- or macro-movements of the display devices, which are caused by the vehicle hitting bumps or potholes in the road, sharp turns, and other aberrations from smooth linear movement of the vehicle.

This disclosure describes system configurations and techniques that leverage a vehicle's in-built or after-market sensor hardware to improve the passenger experience with respect to consuming video data output by in-vehicle displays. Examples of sensor technology that are or can be integrated into vehicles include LiDAR (Light Detection and Ranging), radar, cameras (e.g., still or video cameras), infrared imaging technology, accelerometers, gyroscopes, etc. In many cases, one or more of these sensors form a part of self-driving infrastructure and/or connected vehicle capabilities that are becoming more common with the evolution of vehicle technology.

As such, the system configurations of this disclosure, in many cases, leverage sensor technology that is integrated or added after-market to a vehicle for self-driving or connected vehicle purposes, to implement measures that potentially mitigate occupant motion sickness stemming from the use of displays. In various examples, the systems of this disclosure use data generated by the sensors to generate a movement prediction model for the immediate future. In turn, the systems of this disclosure preemptively adjust the video output of the displays to compensate for micro-movements and/or macro-movements that are imminent, according to the movement prediction model. By adjusting the video output(s) to compensate for these movements when or just before these movements occur, the systems of this disclosure maintain at least some level of congruity between the passenger's visual perception of the video output and the physical movements experienced by the passenger, thereby mitigating or potentially eliminating one of the common causes of motion sickness caused by watching video in a moving vehicle.

In one example, this disclosure describes a method includes storing, by processing circuitry, a predictive movement model to a memory. The method further includes receiving, by the processing circuitry, road condition information, and detecting, by the processing circuitry, a discrepancy between the received road condition information and a portion of the predictive movement model. The method further includes updating, by the processing circuitry, the predictive movement model based on the received road condition information to correct the discrepancy, and controlling, by the processing circuitry, one or more display devices in communication with the processing circuitry to adjust video data output by the one or more display devices based on the updated predictive movement model.

In another example, this disclosure describes a computing system that includes a memory and processing circuitry in communication with the memory. The memory is configured to store a predictive movement model. The processing circuitry is configured to receive road condition information, to detect a discrepancy between the received road condition information and a portion of the predictive movement model, and to update the predictive movement model based on the received road condition information to correct the discrepancy. The processing circuitry is further configured to control one or more display devices in communication with the processing circuitry to adjust video data output by the one or more display devices based on the updated predictive movement model.

In another example, this disclosure describes an apparatus that includes means for storing a predictive movement model, and means for receiving road condition information. The apparatus further includes means for detecting a discrepancy between the received road condition information and a portion of the predictive movement model, means for updating the predictive movement model based on the received road condition information to correct the discrepancy, and means for controlling one or more display devices to adjust video data output by the one or more display devices based on the updated predictive movement model.

In another example, this disclosure describes a non-transitory computer-readable medium encoded with instructions. The instructions, when executed, cause processing circuitry of a computing system to store a predictive movement model, to receive road condition information, to detect a discrepancy between the received road condition information and a portion of the predictive movement model, to update the predictive movement model based on the received road condition information to correct the discrepancy, and to control one or more display devices to adjust video data output by the one or more display devices based on the updated predictive movement model.

The systems of this techniques described in this disclosure provide technical improvements over currently-available technology. As one example, the movement prediction model-based compensation techniques of this disclosure improve the precision of the video output, particularly in the context of the moving vantage point from where the video is viewed, inside of a moving vehicle. As another example, the systems of this disclosure may reduce computing resource usage in some instances of video output correction by utilizing previously-collected data of the currently-navigated road, instead of generating a new movement prediction model. The previously-collected data may be available locally if collected by the same vehicle, or from a cloud-based resource in a crowdsourcing-based implementation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
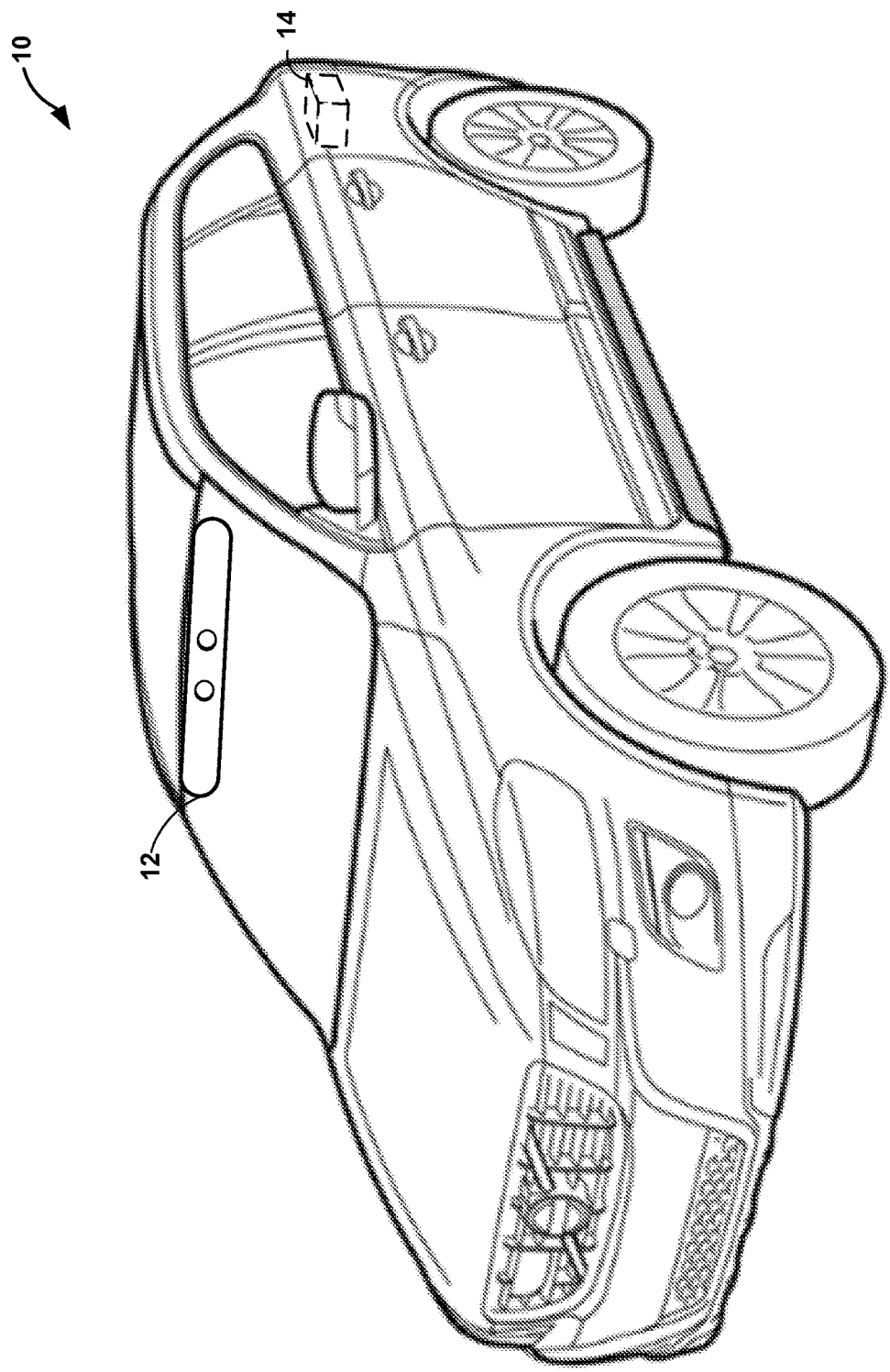
FIG. 1 is a conceptual diagram illustrating an example operating environment of the techniques of this disclosure.

FIG. 1 is a conceptual diagram illustrating an example operating environment of the techniques of this disclosure. As one example, the operating environment of the techniques of this disclosure is automobile 10. In one example of the disclosure, automobile 10 may include components configured to perform various movement prediction model-based display adjustments of this disclosure. Such techniques mitigate or eliminate motion sickness caused by the movements of automobile 10 altering the user experience of viewing the video output by in-vehicle display device(s) of automobile 10. In the example of FIG. 1, automobile 10 may include sensor hardware 12 and a computing system 14. For ease of illustration, sensor hardware 12 is illustrated in FIG. 1 as a single unit. However, sensor hardware 12 may incorporate one or more of the various sensors described herein, including any combination of one or multiple LiDAR detectors, radar detectors, still cameras, moving picture cameras, infrared detectors, accelerometers, gyroscopes, and/or others. While the systems of this disclosure are described with reference to automotive applications (as implemented in automobile 10), it should be understood that the systems of this disclosure may also be implemented in other contexts.

Automobile 10 may be any type of passenger vehicle. Sensor hardware 12 may include one or both of original equipment manufacturer (OEM) parts that are integrated into automobile 10 at the time of factory manufacture, and/or after-market parts that are added to automobile 10 as a modification subsequently to factory manufacture. Sensor hardware 12 may be mounted to automobile 10 or may be integrated in or carried by structure of automobile 10, such as bumpers, sides, windshields, or the like.

Automobile 10 also includes or otherwise has operable access to computing system 14. Computing system 14 is described herein as being an onboard computing system integrated into automobile 10. Computing system 14 may include various components, which are not called out individually in FIG. 1 for ease of illustration. For instance, computing system 14 may include processing circuitry and one or more memory devices. Examples of the processing circuitry of computing system 14 include, but are not limited to, one or more digital signal processors (DSPs), general purpose microprocessors, application specific integrated circuits (ASICs), field programmable logic arrays (FPGAs), fixed function circuitry, programmable processing circuitry, various combinations of fixed function with programmable processing circuitry, or other equivalent integrated circuitry or discrete logic circuitry. The processing circuitry of computing system 14 may be the central processing unit (CPU) of automobile 10. Some components of computing system 10 may be specialized hardware, such as integrated and/or discrete logic circuitry that provide specific functionalities, and optionally, that implement parallel processing capabilities with respect to the processing circuitry of computing system 14.

The processing circuitry of computing system 14 may execute various types of applications, such as various occupant experience related applications including climate control interfacing applications, entertainment and/or infotainment applications, cellular phone interfaces (e.g., as implemented using Bluetooth® links), stock trackers, vehicle functionality interfacing applications, web or directory browsers, or other applications that enhance the occupant experience within the confines of automobile 10. Additionally, the processing circuitry of computing system 14 may also process data received from sensor hardware 12, in order to implement various self-driving capabilities and/or connected vehicle capabilities of automobile 10.

For example, the processing circuitry of computing system 14 may use data received from sensor hardware 12 to provide information to the driver/passengers of automobile 10 about road conditions or speed, and/or to generate autonomous-driving instructions to be stored and/or relayed to engine components of automobile 10. The processing circuitry of computing system 14 may also generate road condition data, or vehicle location data (e.g., GPS coordinates) to be transmitted directly to other vehicles or to a cloud-based administrative system, to implement various connected vehicle capabilities.

The memory devices of computing system 14 may store instructions for execution of one or more of the applications described, as well as instructions to be translated and related to engine components of automobile 10 in machine-interpretable formats. The memory devices of computing system 14 may also store information that is to be transmitted to other vehicles or uploaded to a server in a connected or synchronous vehicle scenario. In various examples, the memory devices of computing system 14 may include a command buffer to which the processing circuitry of computing system 14 stores information.

The memory devices described herein may include, be, or be part of the total memory for automobile 10. The memory devices of computing system 14 may include one or more computer-readable storage media. Examples of memory devices that computing system 14 can incorporate include, but are not limited to, a random access memory (RAM), an electrically erasable programmable read-only memory (EEPROM), flash memory, or other medium that can be used to carry or store desired program code in the form of instructions and/or data structures and that can be accessed by a computer or one or more processors (e.g., the processing circuitry described above).

In some aspects, the memory devices of computing system 14 may store instructions that cause the processing circuitry of computing system 14 to perform the functions ascribed in this disclosure to the processing circuitry. Accordingly, at least one of the memory devices may represent a computer-readable storage medium having instructions stored thereon that, when executed, cause one or more processors (e.g., the processing circuitry) to perform various functions. For instance, at least one of the memory devices is a non-transitory storage medium. The term "non-transitory" indicates that the storage medium is not embodied in a carrier wave or a propagated signal. However, the term "non-transitory" should not be interpreted to mean that the memory devices are non-movable or that the stored contents are static. As one example, at least one of the memory devices described herein can be removed from automobile 10, and moved to another device. As another example, memory, substantially similar to one or more of the above-described memory devices, may be inserted into one or more receiving ports of automobile 10. In certain examples, a non-transitory storage medium may store data that can, over time, change (e.g., in RAM).

Sensor hardware 12 may include a laser emitter that is configured to emit laser pulses, to implement LiDAR-based capabilities. In these examples, sensor hardware 12 further includes a receiver to receive laser light reflected off objects near LiDAR components of sensor hardware 12. To implement LiDAR-based detection, sensor hardware 12 measures distance to an object by illuminating the object with pulsed laser light and measuring the reflected pulses. Differences in return times and wavelengths of the reflected pulses can then be used to determine topographical aberrations, such as road curvature, altitude differences, etc.

Sensor hardware 12 may include a global positioning sensor (GPS) or similar sensor to determine the physical location of the sensor and objects sensed from the reflected laser light. Sensor hardware 12 may be further configured to detect additional information, such as speed, acceleration, angular velocity, orientation, etc. using gyroscope hardware, accelerometer hardware, etc. Computing system 14 may also implement image-processing capabilities in instances where computing system 14 invokes camera hardware of sensor hardware 12 to capture image data. For instance, computing system 14 may perform image-processing to determine aberrations in road conditions that lie ahead in the path of automobile 10.

Computing system 14 may leverage sensor hardware 12 (which includes one or both of sensor technology that is integrated or added after-market to automobile 10 for self-driving or connected vehicle purposes), to implement measures that potentially mitigate occupant motion sickness stemming from the use of in-vehicle displays. In various examples, computing system 14 uses data generated by sensor hardware 12 to generate a movement prediction model for the immediate future. Computing system 14 may, in turn, use the movement prediction model to preemptively adjust the video output of the in-vehicle displays to compensate for imminent micro-movements and/or imminent macro-movements of the in-vehicle displays automobile 10, according to the movement prediction model. By adjusting the video output(s) to compensate for these movements when or just before these movements of the in-vehicle displays occur, computing system 14 may maintain at least some level of congruity between the passenger's visual perception of the video output and the physical movements experienced by the passenger, thereby mitigating or potentially eliminating one of the common causes of motion sickness caused by watching video in a moving vehicle (automobile 10 in this case).

In accordance with system configurations of this disclosure, computing system 14 may use data received from sensor hardware 12 to generate a movement prediction model that provides details (or approximate predictions thereof) with respect to the near future of the present journey of automobile 10. In some instances, such as when computing system 14 is generating a new movement prediction model without leveraging past-collected or crowdsourced road condition information, computing system 14 may generate the movement prediction model within a sensing range of sensor hardware 12. For instance, computing system 14 may generate the model to reflect travel conditions from the present location of automobile 10 to a point that is within the LiDAR, radar, or camera range of sensor hardware 12.

Another value that computing system 14 uses as a parameter or argument in generating the movement prediction model is the speed at which automobile 10 is currently traveling. Although described herein with respect to the scalar quantity of speed, it will be appreciated that in various examples, computing system 14 may also use the vector quantity of velocity, the scalar quantity of acceleration, etc. as measured by one or more accelerometers and/or gyroscopes included in sensor hardware 12. Using the speed at which automobile 10 is traveling toward a detected road condition, computing system 14 may generate the movement prediction model to include a predicted length of time until the detected road condition causes an aberration (e.g., micromovement or macromovement) of in-vehicle display(s) of automobile 10.

Based on the movement prediction model's predicted length of time after which automobile 10 will encounter an aberration in road conditions, and based on the nature of the road condition that will be encountered, computing system 14 may formulate the display compensation measure to be implemented. That is, computing system 14 may determine the way in which the video data is to be adjusted for compensating the aberration so that from the perspective of the viewer the video data does not shift. Computing system 14 may also determine the time at which to implement the video adjustment. For instance, if computing system 14 determines that the detected road condition causes an upward jerk in the movement of automobile 10 (e.g., as may be caused by a speed bump), computing system 14 may formulate a movement of the video output to remain congruent with the viewer's orientation at the time before automobile 10 jerks upward upon encountering the aberration in road conditions. As one scenario, if automobile 10 is traveling at a speed of 36 km/h (10 m/s) and sensor hardware 12 detects a pothole 10 meters away, the passenger(s) of automobile 10 will experience the jolt of hitting the pothole after 1 second. By compensating for the aberrations in the movement of automobile 10 in this way, computing system 14 implements the techniques of this disclosure to reduce or eliminate one possible cause of motion sickness associated with watching an in-vehicle display while traveling in automobile 10.

According to various aspects of this disclosure, computing system 14 may implement the predictive model generation techniques described above using aspects of machine learning. In various examples, computing system 14 may implement machine learning locally (as described below with respect to FIG. 4) and/or may use machine learning-based information obtained from a remote device (as described below with respect to FIG. 2). In some examples, computing system 14 may update previously-generated or previously-accessed predictive movement models based on various factors, such as whether the information collected by sensor hardware 12 is congruent with the already-available movement model, or whether the corrective measures implemented with respect to the video output were effective. For instance, computing system 14 may elicit user feedback from one or more passengers of automobile 10 on whether the video output by the in-vehicle display devices caused motion sickness or were not compensated for shake or jitter to the passengers' satisfaction.

In examples where computing system 14 stores previously-generated or pre-loaded predictive movement models locally at automobile 10, computing system 14 may implement the machine learning aspects of this disclosure to update (e.g., to correct) the locally-stored predictive movement model based on the road condition data that was most recently collected by sensor hardware 12. In examples in which computing system 14 obtains predictive movement models from a remote device, such as a cloud-based server, computing system 14 may communicate the updates (e.g., model corrections) to the server. In this way, computing system 14 may be configured to participate (using identification of automobile 10) in a crowdsourcing-based road condition data collection system administered by a cloud-based server system.

Figure 2:
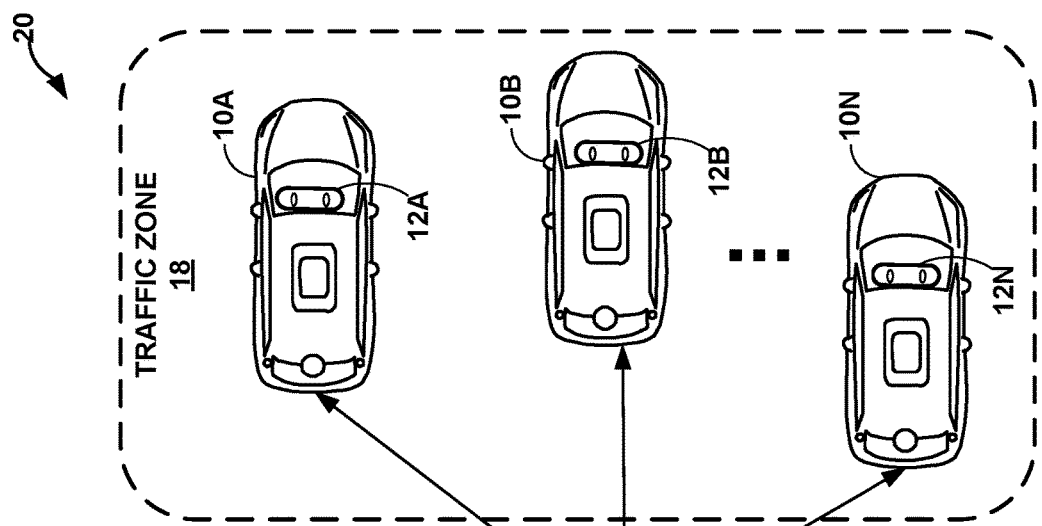
FIG. 2 is a block diagram illustrating an example system of this disclosure, in which a server device communicates via a wireless network with multiple automobiles.
Figure 2:
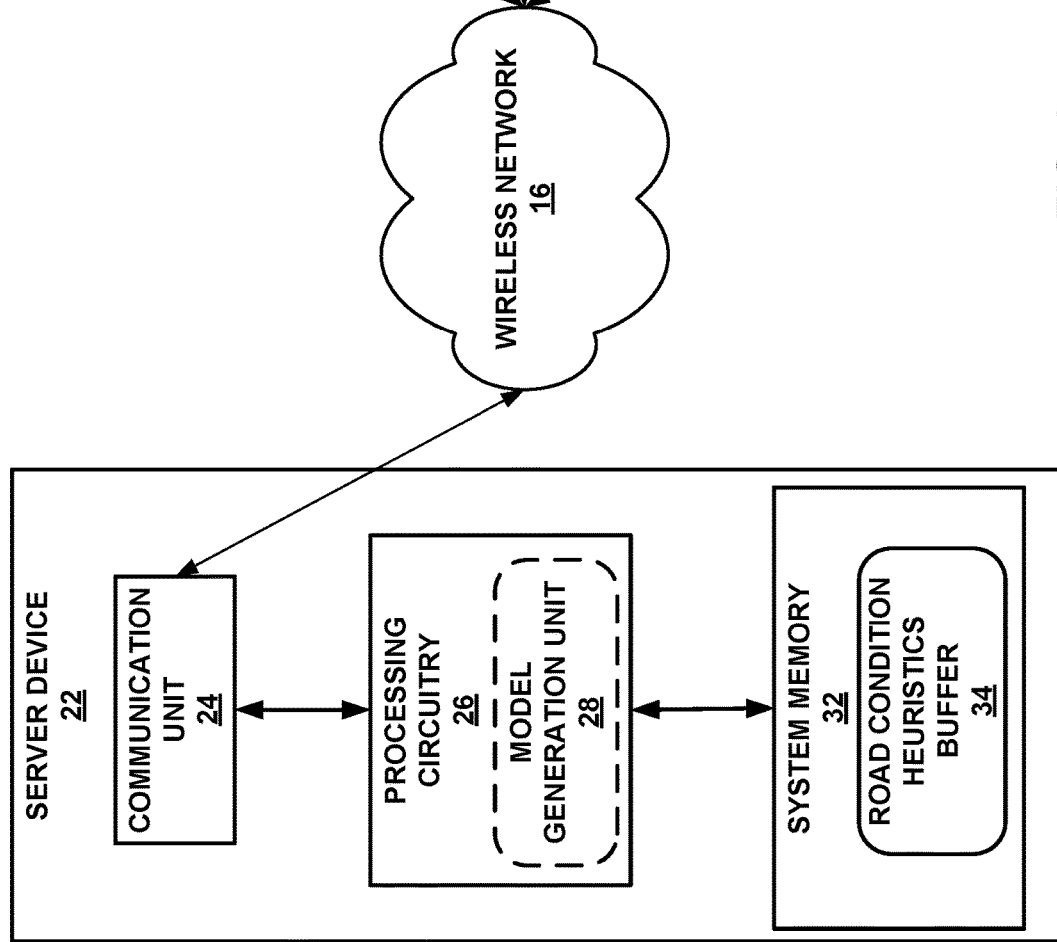

FIG. 2 is a block diagram illustrating an example system 20 of this disclosure, in which a server device 22 communicates via a wireless network 16 with multiple automobiles 10A-10N ("automobiles 10"). Automobile 10 of FIG. 1 represents any one of automobiles 10 illustrated in FIG. 2. Each of automobiles 10 includes respective sensor hardware 12A-12N ("sensor hardware 12"). System 20 of FIG. 2 represents an example in which the techniques of this disclosure are implemented in a crowdsourcing-oriented manner. Server device 22 facilitates the crowdsourcing-based implementations of the techniques of this disclosure with respect to a discrete physical area denoted by traffic zone 18. In the example of FIG. 2, server device 22 may represent a portion or the entirety of a "cloud-based" system for road condition-based display adjustments to mitigate motion sickness. That is, server device 22 is configured to receive and store road condition information, and communicate portions of information to one or more of automobiles 10. In some examples, server device 22 may also implement various machine learning functionalities to tune or update existing road condition information for traffic zone 18. Optionally, server device 22 may also be configured to implement machine learning functionalities to tune or update predictive movement models for any of automobiles 10.

Server device 22 implements various aspects of this disclosure to gather, or crowdsource, road condition information from vehicles traveling through traffic zone 18, and to disseminate road condition and (optionally) movement prediction model information to vehicles traveling through traffic zone 18. For instance, server device 22 uses communication unit 24 to receive information via over wireless network 16. It will be appreciated that communication unit 24 may equip server device 22 with an either a direct interface or a transitive interface to wireless network 16. In cases where communication unit 24 represents a direct interface to wireless network 16, communication unit 24 may include, be, or be part of various wireless communication hardware, including, but not limited to, one or more of Bluetooth®, 3G, 4G, 5G, or WiFi® radios. In cases where communication unit 24 represents a first link in a transitive interface to wireless network 16, communication unit 24 may represent wired communication hardware, wireless communication hardware (or some combination thereof), such as any one or any combination of a network interface card (e.g, an Ethernet card and/or a WiFi® dongle), USB hardware, an optical transceiver, a radio frequency transceiver, Bluetooth®, 3G, 4G, 5G, or WiFi® radios, and so on. Wireless network 16 may also enable the illustrated devices to communicate GPS and/or dGPS, such as location information of one or more of automobiles 10.

While communication unit 24 is illustrated as a single, standalone component of server device 22, it will be appreciated that, in various implementations, communication unit 24 may form multiple components, whether linked directly or indirectly. Moreover, portions of communication unit 24 may be integrated with other components of server device 22. At any rate, communication unit 24 represents network hardware that enables server device 22 to reformat data (e.g., by packetizing or depacketizing) for communication purposes, and to signal and/or receive data in various formats over wireless network 16.

Wireless network 16 may comprise aspects of the Internet or another public network. While not explicitly shown in FIG. 2 for ease of illustration purposes, wireless network 16 may incorporate network architecture comprising various intermediate devices that communicatively link server device 22 to one or more of automobiles 10. Examples of such devices include wireless communication devices such as cellular telephone transmitters and receivers, WiFi® radios, GPS transmitters, etc. Moreover, it will be appreciated that while wireless network 16 delivers data to automobiles 10 and collects data from automobiles 10 using wireless "last mile" components, certain aspects of wireless network 16 may also incorporate tangibly-connected devices, such as various types of intermediate-stage routers.

Communication unit 24 of server device 22 is communicatively coupled to processing circuitry 26 of server device 22. Processing circuitry 26 may be formed in one or more microprocessors, application specific integrated circuits (ASICs), field programmable gate arrays (FPGAs), digital signal processors (DSPs), processing circuitry (including fixed function circuitry and/or programmable processing circuitry), or other equivalent integrated logic circuitry or discrete logic circuitry. As shown in FIG. 2, processing circuitry 26 is communicatively coupled to system memory 32 of server device 22.

System memory 32, in some examples, are described as a computer-readable storage medium and/or as one or more computer-readable storage devices. In some examples, system memory 32 may include, be, or be part of temporary memory, meaning that a primary purpose of system memory 32 is not long-term storage. System memory 32, in some examples, is described as a volatile memory, meaning that system memory 32 do not maintain stored contents when the computer is turned off. Examples of volatile memories include random access memories (RAM), dynamic random access memories (DRAM), static random access memories (SRAM), and other forms of volatile memories known in the art.

In some examples, system memory 32 are used to store program instructions for execution by processing circuitry 26. System memory 32, in one example, are used by logic, software, or applications implemented at server device 22 to temporarily store information during program execution. System memory 32, in some examples, also include one or more computer-readable storage media. Examples of such computer-readable storage media may include a non-transitory computer-readable storage medium, and various computer-readable storage devices. System memory 32 may be configured to store larger amounts of information than volatile memory. System memory 32 may further be configured for long-term storage of information. In some examples, system memory 32 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Automobiles 10 represent vehicles configured to automate one or more tasks associated with vehicle operation. In examples where automobiles 10 are capable of automating some, if not all of the tasks associated with vehicle operation except for providing input related to destination selection. It will be appreciated that automobiles 10 are capable of automating various tasks, although not every vehicle of automobiles 10 may implement automation of each function at all times. That is, in some instances, one or more of automobiles 10 may disable the automation of certain tasks, e.g., based on a user input to instigate such a disabling of one or more operation tasks.

Automobiles 10 are assumed in the description below as passenger cars, although aspects of this disclosure may apply to any type of vehicle capable of conveying one or more occupants and operating autonomously, such as buses, recreational vehicles (RVs), semi-trailer trucks, tractors or other types of farm equipment, trains, motorcycles, personal transport vehicles, and so on. Each of automobiles 10 is equipped with communication logic and interface hardware, by which each of each of automobiles 10 may send and receive data over wireless network 16. Each of automobiles 10 is also equipped with respective sensor hardware 12, which enables each of automobiles 10 to determine road conditions in the surroundings of the respective automobile 10.

One or more of automobiles 10 may collect road condition data in traffic zone 18, and transmit or "upload" the road condition data to server device 22, via wireless network 16. For instance, communication unit 24 may receive data packets from one or more of automobiles 10. Communication unit 24 may decapsulate the packets to obtain respective payload information of the packets. In turn, communication unit 24 may forward the payloads to processing circuitry 26.

Processing circuitry 26 may implement further processing of the payload data of the packets received from automobiles 10. For instance, processing circuitry 26 may determine whether or not a particular payload is applicable to road data collected from within traffic zone 18, or from another traffic zone with respect to which server device 22 is configured to store road condition information. Additionally, processing circuitry 26 may store portions of decapsulated, processed payloads to system memory 32. More specifically, processing circuitry 26 may store the selected portions of the processed payloads to road condition heuristics buffer 34, which is implemented in system memory 32.

Processing circuitry 26 of server device 22 implements various techniques of this disclosure to gather and store road condition information within traffic zone 18. In turn, processing circuitry 26 may invoke communication unit 24 to transmit portions of the road condition data stored in road condition heuristics buffer to one or more of automobiles 10. That is, one or more of automobiles 10 may obtain, from server device 22, crowdsourced road condition information about traffic zone 18. As examples, any of automobiles 10 may obtain road condition information previously uploaded by others of automobiles 10, and/or by the same automobile 10, and/or by other vehicles that have previously traveled in traffic zone 18.

In turn, the respective automobile 10 that acquires the road condition data from server device 22 over wireless network 16 may use the road condition data to perform in-vehicle display adjustment measures of this disclosure. In these examples, one or more of automobiles 10 leverage crowdsourced road condition information for traffic zone 18, thereby alleviating or sometimes eliminating the need to use respective sensor hardware 12 to collect road condition data during the journey. In some examples, automobiles 10 may tune the road condition data stored to road condition heuristics buffer 34 by uploading more up-to-date road condition information, if the latest collected road condition data is incongruent with the data available from road condition heuristics buffer 34. Processing circuitry 26 may update the information stored to road condition heuristics buffer 34 based on the most-recently received road condition data from traffic zone 18. In this way, the crowdsourcing-based techniques of this disclosure enable server device 22 to maintain current road condition information with respect to traffic zone 18 by leveraging data uploaded by automobiles 10.

In some examples, server device 22 may perform certain aspects of generating display adjustments described above with respect to automobile 10. Processing circuitry 26 may invoke model generation unit 28, which may use location information of one or more of automobiles 10 (as determined using GPS coordinates) to determine the location of road conditions that the respective automobiles 10 may use to adjust displayed video data to improve the user experience of the passengers. In these examples, server device 22 may provide road condition data of traffic zone 18 (or portions thereof) to automobiles 10 before automobiles 10 encounter the road conditions. In turn, automobiles 10 may use the road condition data received from server device 22 to generate video adjustment measures to implement at the time of or before encountering the road conditions.

In this way, server device 22 may leverage the data stored to road condition heuristics buffer 34 (e.g., data gathered from past trips) to enable automobiles to generate the movement prediction model using already-available data in some areas. These aspects of the system configurations of this disclosure thereby reduce the resource consumption at automobiles 10 that would otherwise be caused by dynamic model generation throughout the entire duration of every trip. Model generation unit 28 is shown in FIG. 2 using dashed lines to illustrate the optional nature of server device 22 being configured to perform the functionalities ascribed above to model generation unit 28. Model generation unit 28 may use the most up-to-date information stored to road condition heuristics buffer 34 to generate the predictive movement model, thereby leveraging the crowdsourcing-based and/or machine learning-based aspects of this disclosure.

Figure 3A:
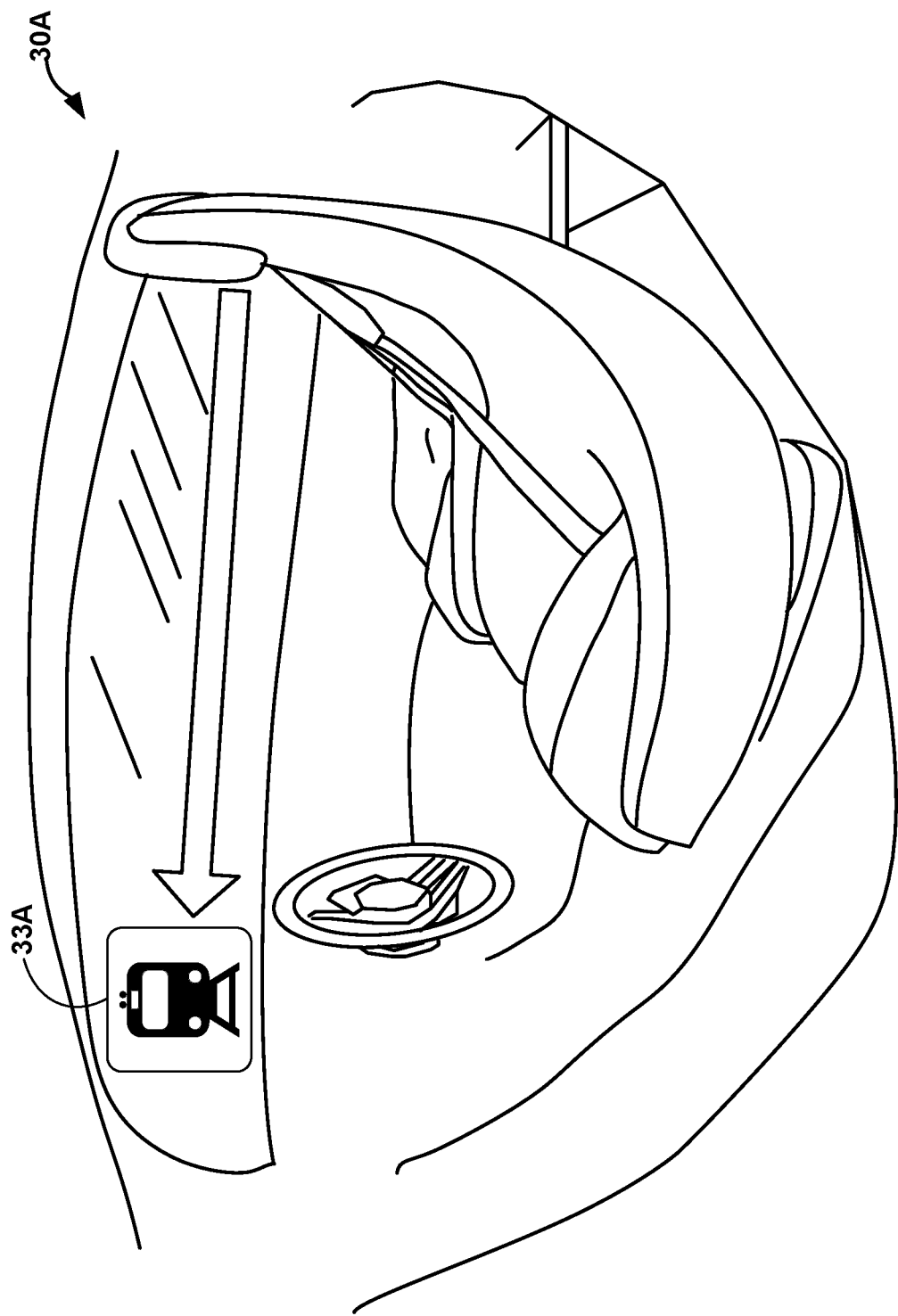
FIGS. 3A-3C are conceptual diagrams illustrating different examples of a cabin of an automobile of this disclosure.
Figure 3B:
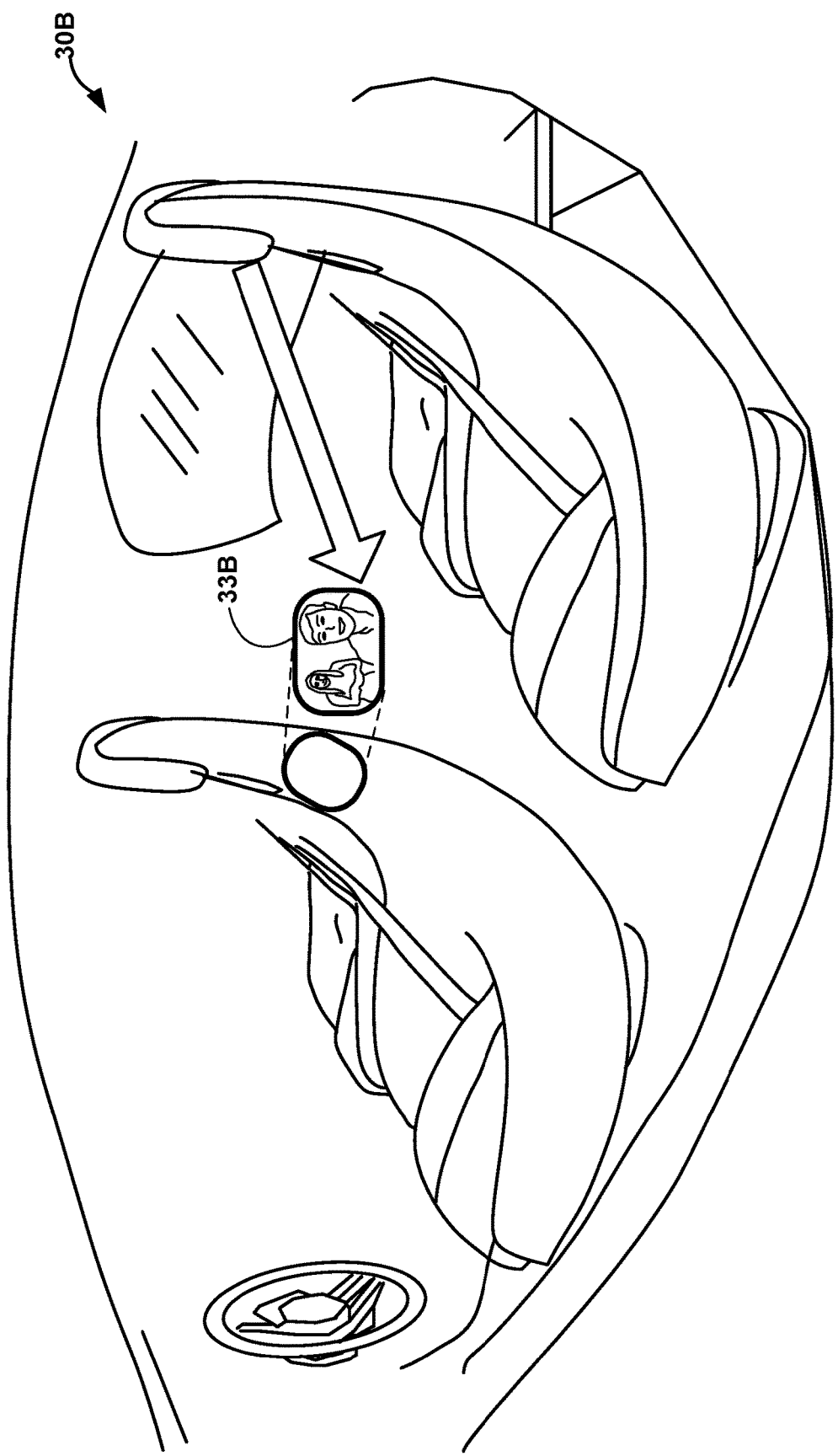
Figure 3C:

FIGS. 3A-3C are conceptual diagrams illustrating different examples of a cabin 30 (called out as cabin 30A, 30B, and 30C, respectively) of automobile 10. Each of FIGS. 3A-3C illustrates a use-case scenario in which computing system 14 may implement motion sickness alleviation (e.g., machine-learning or crowdsourcing-based motion sickness alleviation) techniques of this disclosure. For example, computing system 14 or server device 22 may update a predictive movement model based on data received sensor hardware 12. In turn, computing system 14 (whether based on a locally-updated model or an updated model received from server device 22) may provide video data adjustments to one or more of in-vehicle displays 33A-33C. Cabin 30 is illustrated in FIGS. 3A-3C without passengers being seated in cabin 30, for ease of illustration purposes only.

FIG. 3A illustrates an example in which the in-vehicle display 33A represents a VR/AR overlay on a windshield of cabin 30A of automobile 10. In the example of FIG. 3A, in-vehicle display 33A presents traffic conditions, such as traffic conditions at a later stage of a present trip that automobile 10 is traveling on, such as a railway crossing stop. In some examples, the VR/AR overlays may be implemented on windows of cabin 30A, either instead of or in addition to the illustrated VR/AR overlay on the windshield.

FIG. 3B illustrates an example in which the in-vehicle display 33B represents a portion an in-cabin infotainment or entertainment system of cabin 30B of automobile 10. In the example of FIG. 3B, in-vehicle display 33A presents entertainment content, such as a movie or a television show.

FIG. 3C illustrates an example in which the in-vehicle display 33C represents a portable device brought into cabin 30C of automobile 10 by a passenger (not shown). In the example of FIG. 3C, in-vehicle display 33C presents entertainment content. In some examples, the portable device (e.g., tablet computer, smartphone, etc.) that includes in-vehicle display 33C may communicate with computing system 14 via wired or wireless means, such as USB, Bluetooth®, or others. In any of the scenarios illustrated in FIGS. 3A-3C, computing system 14 may leverage predictive movement information generated using machine learning-based techniques of this disclosure to adjust the image or video data output by in-vehicle displays 30, to alleviate or potentially eliminate stimuli that cause motion sickness in passengers of automobile 10.

Figure 4:
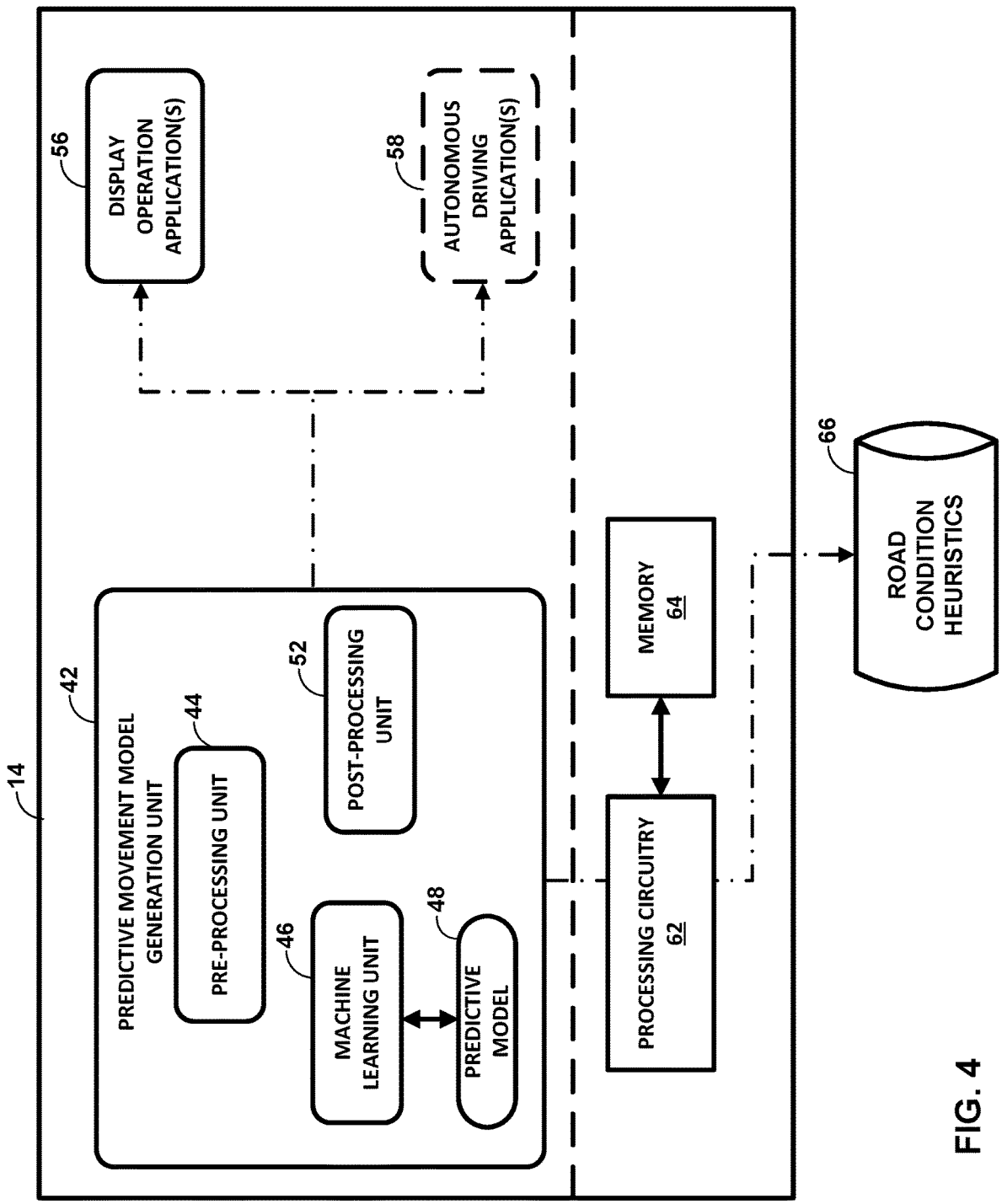
FIG. 4 is a block diagram illustrating an example apparatus configured to perform the techniques of this disclosure.

FIG. 4 is a block diagram illustrating an example apparatus configured to perform the techniques of this disclosure. In particular, FIG. 4 shows an portions of computing system 14 of FIG. 1 in more detail. Again, in some examples, computing system 14 may be part of automobile 10. However, in other examples, computing system 14 may be a stand-alone system or may be integrated into other devices for use in other applications which may benefit from pose estimation. It will be understood that, in some examples, various functionalities attributed to server device 22 in the description of FIG. 2 above may be implemented by computing system 14. Again, various functionalities of this disclosure may be implemented locally at automobile 10 (e.g., by computing system 14) or remotely (e.g., by server device 22 of FIG. 2).

In the example of FIG. 4, predictive movement model generation unit 42 includes a pre-processing unit 44, a machine learning unit 46, and a post-processing unit 52. Predictive movement model generation unit 42 is configured to receive road condition information from sensor hardware 12. Pre-processing unit 44 is configured to make the unstructured raw input (i.e., road conditions and/or the speed at which automobile 10 is traveling) into structuralized data that can be processed by other components of predictive movement model generation unit 42 and/or of computing system 14.

Pre-processing unit 44 may be configured to provide the structuralized data to machine learning unit 46. Machine learning unit 46 may implement various forms of machine learning technology, including, but not limited to, artificial neural networks, deep learning, support vector machine technology, Bayesian networks, etc. Using the structuralized data obtained from pre-processing unit 44, machine learning unit 46 may perform comparison operations with respect to predictive model 48. If machine learning unit 46 detects a discrepancy between any of the structuralized data received from pre-processing unit 44 and the road conditions reflected in predictive model 48, machine learning unit 46 may update the data of predictive model 48 to incorporate the more up-to-date road condition information of traffic zone 18. In this way, machine learning unit 46 implements dynamic model generation or model updating operations of this disclosure to use and to share updates to obsolete road condition information at traffic zone 18.

Post-processing unit 52 may obtain the updated version of predictive model 48, and convert the data of predictive model 48 into final output. For example, post-processing unit 52 may be configured to translate predictive model 48 into one or more machine-readable formats. In various examples, predictive movement model generation unit 42 may provide the output generated by post-processing unit 52 to one or more display operation applications 56. Display operation applications 56 may implement various techniques of this disclosure to adjust the video output of in-cabin displays 30 to compensate for jitter, shakes, or other micro/macro movements of automobile 10 due to aberrations in road conditions.

In some examples, one or more autonomous driving applications 58 may use the predictive model information received from post-processing unit 52 to determine autonomous driving actions to be taken, based on road conditions. Autonomous driving applications 58 are illustrated in FIG. 4 using a dashed-line border to indicate that the use of predictive movement models of this disclosure need not necessarily be used for autonomous driving operations, and indeed, may be implemented both in vehicles that have and in vehicles that do not have autonomous driving capabilities.

Computing system 14 includes processing circuitry 62 in communication with memory 64. Processing circuitry 62 may be implemented as fixed-function processing circuitry, programmable processing circuitry, or any combination thereof. Fixed-function circuitry refers to circuits that provide particular functionality and are preset on the operations that can be performed. Programmable processing circuitry refers to circuits that can programmed to perform various tasks and provide flexible functionality in the operations that can be performed. For instance, programmable processing circuitry may represent hardware that executes software or firmware that cause programmable circuits to operate in the manner defined by instructions of the software or firmware. Fixed-function circuitry may execute software instructions (e.g., to receive parameters or output parameters), but the types of operations that the fixed-function processing circuits perform are generally immutable. In some examples, one or more of the units may be distinct circuit blocks (fixed-function or programmable), and in some examples, the one or more units may be integrated circuits.

Processing circuitry 62 may be configured to execute a set of instructions in predictive movement model generation unit 42 to perform various techniques of this disclosure. The instructions that define predictive movement model generation unit 42 may be stored in memory 64. In some examples, the instructions that define predictive movement model generation unit 42 may be downloaded to the memory 64 over a wired or wireless network.

In some examples, memory 64 may be a temporary memory, meaning that a primary purpose of memory 64 is not long-term storage. Memory 64 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 64 may include one or more non-transitory computer-readable storage mediums. Memory 64 may be configured to store larger amounts of information than typically stored by volatile memory. Memory 64 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 64 may store program instructions (e.g., predictive movement model 42) and/or information (e.g., predictive model 48) that, when executed, cause processing circuitry 62 to perform the techniques of this disclosure.

Processing circuitry 62 may store the most up-to-date version of predictive model 48 to road condition heuristics store 66. In various examples, road condition heuristics store 66 may be positioned within automobile 10, or may be a remote store, such as in the case of road condition heuristics buffer 34 of FIG. 2. In either case, processing circuitry 62 may use communications hardware, such as an communications bus (if road condition heuristics store 66 is positioned within automobile 10) or a network interface (e.g., interface hardware), such as 3G, 4G, 5G, WiFi®, etc. in cases where road condition heuristics store 66 is positioned at a remote location.

Figure 5:
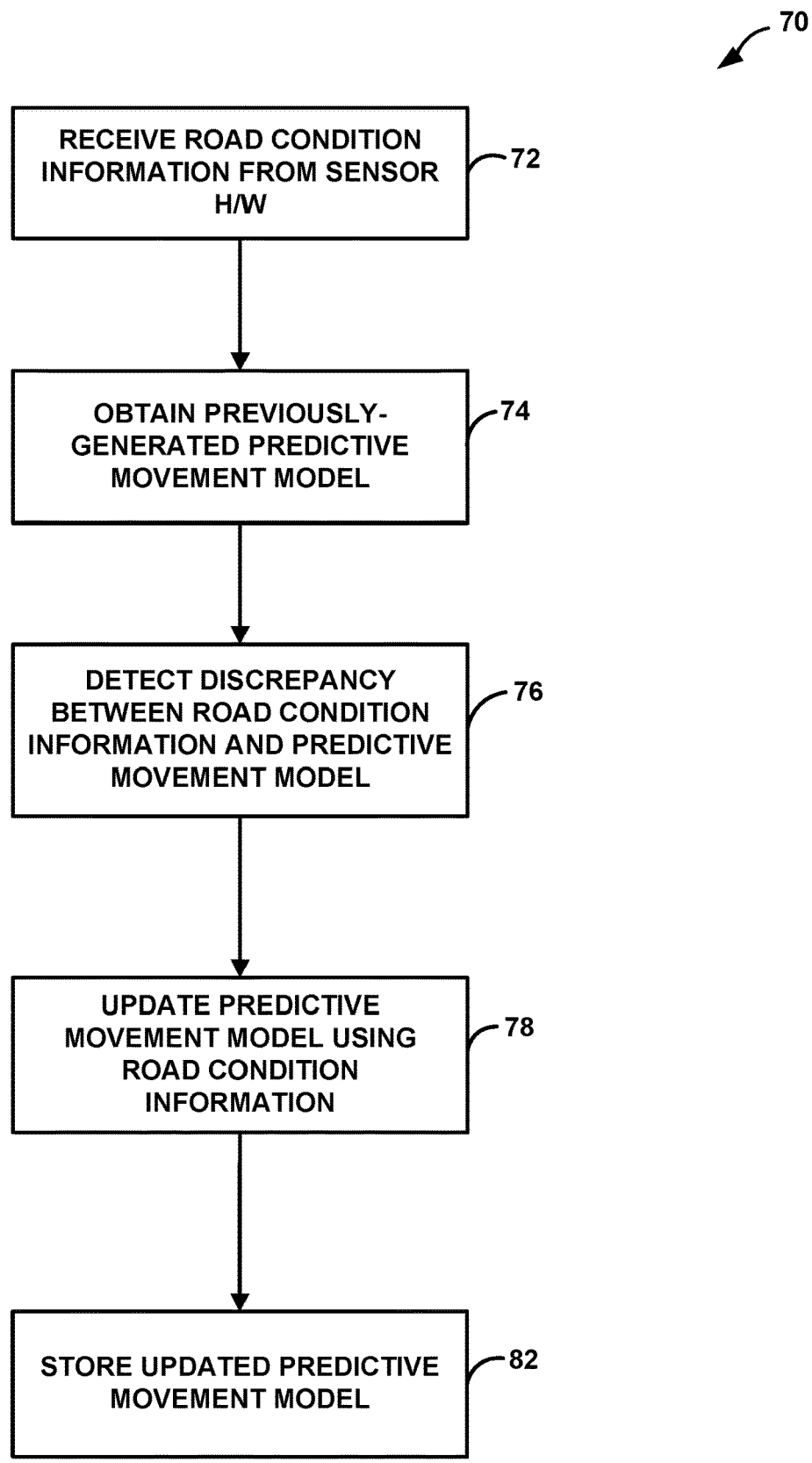
FIG. 5 is a flowchart illustrating an example process that a computing system may perform, in accordance with one example of the disclosure.

FIG. 5 is a flowchart illustrating an example process 70 that computing system 54 may perform, in accordance with one example of the disclosure. One or more processors, such as processing circuitry 62 of computing system 14 may be configured to perform the techniques shown in FIG. 5. As described above, in some examples, computing system 14 may be part of automobile 10. In this example, automobile 10 may be configured to use the predictive movement model information produced by computing system 14 to adjust video outputs of in-vehicle display devices. However, the techniques of this disclosure are not so limited. Computing system 14 may be configured to perform the techniques of FIG. 5 for autonomous driving decisions or the like.

In one example of the disclosure, computing system 14 may receive road condition information from sensor hardware 12 (72). In turn, computing system 14 may further obtain a previously-generated predictive movement model with respect to the present location of automobile 10 (74). In various examples, computing system 14 may obtain the predictive movement model from a local storage device, such as memory 64, or from a remote device, such as from server device 22. In various examples, computing system 14 may control one or more display devices (e.g., one or more of in-vehicle displays 33) in communication with processing circuitry of computing system 14 to adjust video data output by the one or more display devices based on the updated predictive movement model.

In turn, computing system 14 may detect a discrepancy between the road condition information from sensor hardware 12 and the predictive movement model (76). For example, computing system 14 may invoke machine learning unit 46 to perform the comparison operations used to detect the discrepancy. Computing system 14, such as by invoking machine learning unit 46, may update the predictive movement model using the road condition information received from sensor hardware 12 (78). That is, computing system 14 may update the predictive movement model in response to the detected discrepancy between the dynamically-collected road condition information and the predictive movement model.

In turn, computing system 14 may store the updated predictive movement model (82). In various examples, computing system 14 may store the updated predictive movement model locally (e.g. to memory 64) or to a remote location (e.g., by transmitting the updated predictive movement model to server device 22). As shown in FIG. 5, computing system 14 may implement process 70 in an iterative manner (returning from step 82 to step 72), such as by iteratively performing process 70 at different locations on a journey of automobile 10.

Example 1: A computing system comprising a memory configured to store a predictive movement model; and processing circuitry in communication with the memory, the processing circuitry configured to: receive road condition information; detect a discrepancy between the received road condition information and a portion of the predictive movement model; update the predictive movement model based on the received road condition information to correct the discrepancy; and control one or more display devices in communication with the processing circuitry to adjust video data output by the one or more display devices based on the updated predictive movement model.

Example 2: The computing system of Example 1, wherein to update the predictive movement model, the processing circuitry is configured to implement machine learning.

Example 3: The computing system of either Example 1 or Example 2, wherein to control the one or more display devices to adjust the video data, the processing circuitry is configured to: determine a time of a physical movement of the one or more display devices; and control the one or more display devices to adjust the video data output at or before the time of the physical movement.

Example 4: The computing system of any of Examples 1-3, wherein the processing circuitry is in communication with sensor hardware, and wherein to receive the road condition information, the processing circuitry is configured to receive the road condition information from the sensor hardware.

Example 5: The computing system of Example 4, wherein the received road condition information comprises road condition information associated with a present location of a vehicle to which the sensor hardware is coupled.

Example 6: The computing system of Example 5, wherein the received road condition information associated with the present location of the vehicle indicates an aberration in a road on which the vehicle is traveling.

Example 7: The computing system of Example 6, wherein the processing circuitry is in communication with one or more display devices, and wherein the processing circuitry is further configured to control the one or more display devices to adjust video data output by the one or more display devices to reduce motion sickness caused by movement of the one or more display devices due to the aberration in the road on which the vehicle is traveling.

Example 8: The computing system of any of Examples 4-7, wherein the sensor hardware comprises one or more of a LiDAR device, a radar device, a gyroscope, or an accelerometer.

Example 9: The computing system of any of Examples 1-8, wherein the one or more display devices comprise one or more of a display of an in-vehicle infotainment system, a display device configured to output a virtual reality overlay, a display device configured to output an augmented reality overlay, or a portable device that is communicatively coupled to the computing system via interface hardware of a vehicle that includes the computing system.

Example 10: An apparatus comprising: means for storing a predictive movement model; means for receiving road condition information; means for detecting a discrepancy between the received road condition information and a portion of the predictive movement model; means for updating the predictive movement model based on the received road condition information to correct the discrepancy; and means for controlling one or more display devices to adjust video data output by the one or more display devices based on the updated predictive movement model.

Example 11: A method comprising: storing, by processing circuitry, a predictive movement model to a memory; receiving, by the processing circuitry, road condition information; detecting, by the processing circuitry, a discrepancy between the received road condition information and a portion of the predictive movement model; updating, by the processing circuitry, the predictive movement model based on the received road condition information to correct the discrepancy; and controlling, by the processing circuitry, one or more display devices in communication with the processing circuitry to adjust video data output by the one or more display devices based on the updated predictive movement model.

Example 12: The method of Example 11, wherein updating the predictive movement model comprises updating, by the processing circuitry, the predictive movement model according to machine learning.

Example 13: The method of either Example 11 or Example 12, wherein controlling the one or more display devices to adjust the video data comprises: determining, by the processing circuitry, a time of a physical movement of the one or more display devices; and controlling, by the processing circuitry, the one or more display devices to adjust the video data output at or before the time of the physical movement.

Example 14: The method of any of Examples 11-13, wherein the received road condition information comprises road condition information associated with a present location of a vehicle.

Example 15: The method of any of Examples 11-14, wherein the received road condition information associated with the present location of the vehicle indicates an aberration in a road on which the vehicle is traveling.

Example 16: A non-transitory computer-readable storage medium encoded with instructions that, when executed, cause processing circuitry of a computing system to: store a predictive movement model; receive road condition information; detect a discrepancy between the received road condition information and a portion of the predictive movement model; update the predictive movement model based on the received road condition information to correct the discrepancy; and control one or more display devices to adjust video data output by the one or more display devices based on the updated predictive movement model.

Example 17: The non-transitory computer-readable storage medium of Example 16, wherein the instructions that, when executed, cause the processing circuitry to update the predictive movement model comprise instructions that, when executed, cause the processing circuitry to update the predictive movement model according to machine learning.

Example 18: The non-transitory computer-readable storage medium of either Example 16 or Example 17, wherein the instructions that, when executed, cause the processing circuitry to control the one or more display devices to adjust the video data comprise instructions that, when executed, cause the processing circuitry to: determine a time of a physical movement of the one or more display devices; and control the one or more display devices to adjust the video data output at or before the time of the physical movement.

Example 19: The non-transitory computer-readable storage medium of any of Examples 16-18, wherein the received road condition information comprises road condition information associated with a present location of a vehicle.

Example 20: The non-transitory computer-readable storage medium of Example 19, wherein the received road condition information associated with the present location of the vehicle indicates an aberration in a road on which the vehicle is traveling.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples of the invention have been described. These and other examples are within the scope of the following claims.

What is claimed is:

1. A computing system comprising:
a memory configured to store a predictive movement model; and
processing circuitry in communication with the memory, the processing circuitry configured to:
receive road condition information;
detect a discrepancy between the received road condition information and a portion of the predictive movement model;
update the predictive movement model based on the received road condition information to correct the discrepancy;
determine, based on the updated predictive movement model, a time of a physical movement of one or more display devices in communication with the processing circuitry; and
control, at or before the determined time of the physical movement, the one or more display devices to adjust video data output by the one or more display devices.

2. The computing system of claim 1, wherein to update the predictive movement model, the processing circuitry is configured to implement machine learning.

3. The computing system of claim 1, wherein the processing circuitry is in communication with sensor hardware, and wherein to receive the road condition information, the processing circuitry is configured to receive the road condition information from the sensor hardware.

4. The computing system of claim 3, wherein the received road condition information comprises road condition information associated with a present location of a vehicle to which the sensor hardware is coupled.

5. The computing system of claim 4, wherein the received road condition information associated with the present location of the vehicle indicates an aberration in a road on which the vehicle is traveling.

6. The computing system of claim 5, wherein the processing circuitry is in communication with one or more display devices, and wherein the processing circuitry is further configured to control the one or more display devices to adjust video data output by the one or more display devices to reduce motion sickness caused by movement of the one or more display devices due to the aberration in the road on which the vehicle is traveling.

7. The computing system of claim 3, wherein the sensor hardware comprises one or more of a LiDAR device, a radar device, a gyroscope, or an accelerometer.

8. The computing system of claim 1, wherein the one or more display devices comprise one or more of a display of an in-vehicle infotainment system, a display device configured to output a virtual reality overlay, a display device configured to output an augmented reality overlay, or a portable device that is communicatively coupled to the computing system via interface hardware of a vehicle that includes the computing system.

9. An apparatus comprising:
means for storing a predictive movement model;
means for receiving road condition information;
means for detecting a discrepancy between the received road condition information and a portion of the predictive movement model;
means for updating the predictive movement model based on the received road condition information to correct the discrepancy;
means for determining, based on the updated predictive movement model, a time of a physical movement of one or more display devices; and
means for controlling, at or before the determined time of the physical movement, the one or more display devices to adjust video data output by the one or more display devices.

10. A method implemented using processing circuitry, the method comprising:
storing a predictive movement model to a memory;
detecting a discrepancy between received road condition information and a portion of the predictive movement model;
updating the predictive movement model based on the received road condition information to correct the discrepancy;
determining, based on the updated predictive movement model, a time of a physical movement of one or more display devices in communication with the processing circuitry; and
controlling, at or before the determined time of the physical movement, the one or more display devices to adjust video data output by the one or more display devices.

11. The method of claim 10, wherein updating the predictive movement model comprises updating the predictive movement model according to machine learning.

12. The method of claim 10, wherein the received road condition information comprises road condition information associated with a present location of a vehicle.

13. The method of claim 12, wherein the received road condition information associated with the present location of the vehicle indicates an aberration in a road on which the vehicle is traveling.

14. A non-transitory computer-readable storage medium encoded with instructions that, when executed, cause processing circuitry of a computing system to:
store a predictive movement model;
receive road condition information;
detect a discrepancy between the received road condition information and a portion of the predictive movement model;
update the predictive movement model based on the received road condition information to correct the discrepancy;
determine, based on the updated predictive movement model, a time of a physical movement of one or more display devices in communication with the processing circuitry; and
control, at or before the determined time of the physical movement, the one or more display devices to adjust video data output by the one or more display devices based on the updated predictive movement model.

15. The non-transitory computer-readable storage medium of claim 14, wherein the instructions that, when executed, cause the processing circuitry to update the predictive movement model comprise instructions that, when executed, cause the processing circuitry to update the predictive movement model according to machine learning.

16. The non-transitory computer-readable storage medium of claim 14, wherein the received road condition information comprises road condition information associated with a present location of a vehicle.

17. The non-transitory computer-readable storage medium of claim 16, wherein the received road condition information associated with the present location of the vehicle indicates an aberration in a road on which the vehicle is traveling.

* * * * *

UNITED STATES PATENT AND TRADEMARK OFFICE
CERTIFICATE OF CORRECTION

PATENT NO. : 10,694,078 B1
APPLICATION NO. : 16/279346
DATED : June 23, 2020
INVENTOR(S) : Staffan Davidsson and Vincent Nils Oliver Tollesson Page 1 of 1

It is certified that error appears in the above-identified patent and that said Letters Patent is hereby corrected as shown below:

In the Claims

Column 18, Lines 53-55 (Claim 14) Replace "video data output by the one or more display devices based on the updated predictive movement model." with --video data output by the one or more display devices.--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*